United States Patent
Jain

(10) Patent No.: US 9,321,675 B2
(45) Date of Patent: Apr. 26, 2016

(54) FABRICATION OF POROUS GLASS BIOSCAFFOLDS BY SOL-GEL AND POLYMER SPONGE METHODS

(75) Inventor: Himanshu Jain, Bethlehem, PA (US)

(73) Assignee: Lehigh University, Bethlehem, PA (US)

(*) Notice: Subject to any disclaimer, the term of this patent is extended or adjusted under 35 U.S.C. 154(b) by 501 days.

(21) Appl. No.: 13/617,293

(22) Filed: Sep. 14, 2012

(65) Prior Publication Data

US 2014/0075993 A1    Mar. 20, 2014

Related U.S. Application Data

(63) Continuation of application No. PCT/US2011/028695, filed on Mar. 16, 2011.

(60) Provisional application No. 61/314,377, filed on Mar. 16, 2010.

(51) Int. Cl.
| | | |
|---|---|---|
| C03C 11/00 | (2006.01) | |
| C03C 1/00 | (2006.01) | |
| C03C 3/078 | (2006.01) | |
| C03C 4/00 | (2006.01) | |
| C04B 35/622 | (2006.01) | |
| C03B 19/06 | (2006.01) | |
| C03B 19/12 | (2006.01) | |
| C04B 38/06 | (2006.01) | |
| C04B 111/00 | (2006.01) | |

(52) U.S. Cl.
CPC .............. *C03C 11/00* (2013.01); *C03B 19/06* (2013.01); *C03B 19/12* (2013.01); *C03C 1/006* (2013.01); *C03C 3/078* (2013.01); *C03C 4/0007* (2013.01); *C04B 35/622* (2013.01); *C04B 38/0625* (2013.01); *C04B 2111/00836* (2013.01); *C04B 2235/36* (2013.01); *C04B 2235/616* (2013.01)

(58) Field of Classification Search
CPC ............................ C03C 4/007; C03B 19/1065
USPC ........................................................... 65/17.2
See application file for complete search history.

(56) References Cited

U.S. PATENT DOCUMENTS

| | | | |
|---|---|---|---|
| 6,993,406 B1* | 1/2006 | Cesarano et al. | 700/119 |
| 7,041,615 B2* | 5/2006 | Mikkenie et al. | 501/139 |
| 8,277,829 B2* | 10/2012 | Jain et al. | 424/422 |
| 2003/0078156 A1* | 4/2003 | Lowden et al. | 501/127 |
| 2007/0162151 A1* | 7/2007 | Chang et al. | 623/23.56 |
| 2010/0016989 A1* | 1/2010 | Lyngstadaas et al. | 623/23.72 |

(Continued)

FOREIGN PATENT DOCUMENTS

WO    WO 2008/028036    * 3/2008

*Primary Examiner* — Russell Kemmerle, III
(74) *Attorney, Agent, or Firm* — Saul Ewing LLP

(57) ABSTRACT

Provided herein are biocompatible scaffolds and methods of preparing such bioscaffolds. The methods provide a superior high surface area, interconnected nanomacroporous bioactive glass scaffold, by combining a sol-gel process and polymer sponge replication methods. The formation of a uniformly nanoporous and interconnected macroporous bioscaffold is demonstrated using a starting material comprising a 70 mol % $SiO_2$—30 mol % CaO glass composition as an example. The bioscaffold includes a series of open, interconnected macropores with size from 300 to 600 μm, as desired for tissue ingrowth and vascularization. At the same time, coexisting nanopores provide high-specific surface area (>150 m2/g), which is needed for enhancing the structure's degradation rate. These bioscaffolds hold promise for applications in hard tissue engineering.

18 Claims, 5 Drawing Sheets

(56) References Cited

U.S. PATENT DOCUMENTS

| | | | |
|---|---|---|---|
| 2010/0179662 A1* | 7/2010 | Verne et al. | 623/20.32 |
| 2010/0272826 A1* | 10/2010 | Jain et al. | 424/602 |
| 2014/0272418 A1* | 9/2014 | Jung | 428/410 |
| 2014/0302165 A1* | 10/2014 | Pomrink et al. | 424/602 |

* cited by examiner

FABRICATION OF POROUS GLASS BIOSCAFFOLDS BY SOL-GEL AND POLYMER SPONGE METHODS

CROSS-REFERENCE TO RELATED APPLICATIONS

This application claims the priority of U.S. Provisional Patent Application No. 61/314,377, filed on Mar. 16, 2010, which is incorporated herein by reference in its entirety.
Not Applicable

STATEMENT REGARDING FEDERALLY SPONSORED RESEARCH OR DEVELOPMENT

This invention was made with U.S. Government support under Grant No. DMR-0602975 awarded by the National Science Foundation. The U.S. Government has certain rights in the invention.

BACKGROUND

There is a continuing need for bioscaffolds, such as for use in medical applications and treatments, as well as in biological research. Bioactive materials, such as bioactive ceramics ("bioceramics") and bioactive glass ("BG"), are of interest for numerous biomedical applications. These materials make direct interfacial bond with the host tissue, in contrast to conventional bio-inert materials like titanium and cobalt-chrome alloys that cause scar tissue formation. Therefore, bioactive glass and bioceramics have been developed as implants to replace hard tissues of the musculo-skeletal system, such as bones and teeth. However, known conventional bioceramics and bulk bioactive glass do not degrade efficiently, and are expected to remain in the human body for a long time. The remaining material causes abnormal biomechanical and bioelectric stimuli to host tissue due to the mismatch in mechanical properties at the interface of implant and the host tissue, and lead to the inability of tissue remodeling in response to applied load. In order to overcome this problem, a different treatment approach has been proposed based on tissue engineering: rather than providing an implant as replacement for the diseased bone, progenitor cells harvested from patients' body are seeded and grown on a scaffold that is implanted into patients. An ideal bioscaffold would not only provide a three dimensional (3D) structure for the regeneration of natural tissue, but should also degrade gradually and, eventually be replaced by the natural tissue completely.

SUMMARY

Provided herein are bioscaffolds and methods of making the bioscaffolds. The bioscaffolds are biocompatible and include nanopores, macropores and/or combinations thereof. The methods provided herein utilize sponges as templates for a glass and/or glass-ceramic precursor material, and hold the precursor material in a desired shape prior to converting the precursor material to a glass, ceramic, or glass-ceramic scaffold. In some embodiments, the methods and resulting bioscaffolds described herein integrate a sol-gel process with sponge replication methods to fabricate porous scaffolds having high specific surface area and well controlled macropore sizes over a broad range suitable for many applications, such as hard tissue engineering In one embodiment, a method is provided for producing a biocompatible scaffold. That method includes: a) providing a slurry composition, the slurry composition comprising at least one glass precursor material; b) providing a sponge template; c) infiltrating the sponge template with the slurry; d) optionally removing excess slurry from the sponge template; and e) heating the sponge template to a temperature and for a time sufficient to convert the slurry composition into a scaffold comprising at least one of a glass, ceramic, glass-ceramic, or any combination thereof. In this example, the scaffold produced comprises a series of interconnected macropores, and further comprises nanopores.

DETAILED DESCRIPTION

Figure 1:
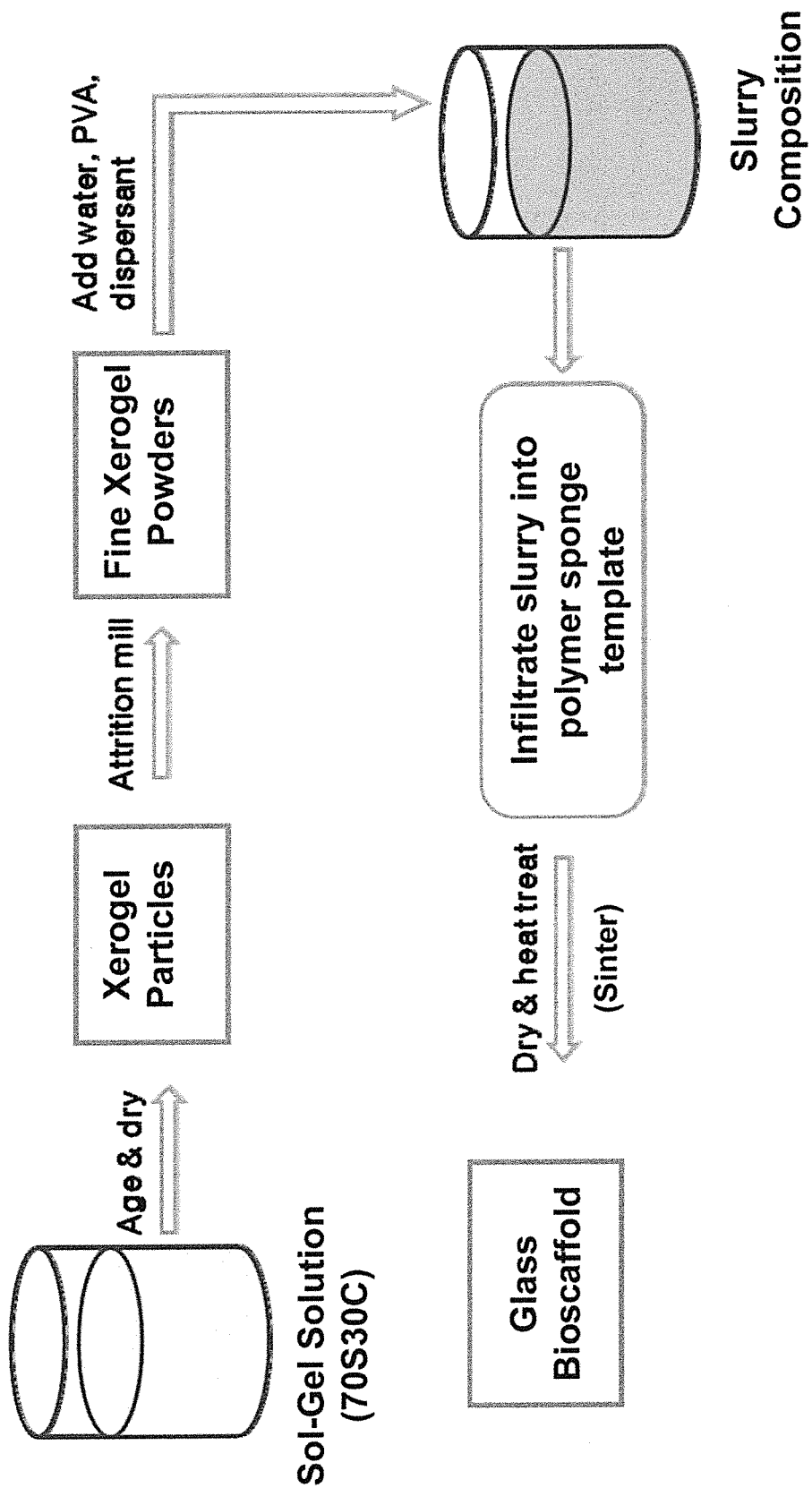
FIG. 1 is a flow diagram of exemplary methods for providing bioactive glass scaffold by a sol-gel process and polymer sponge replication method.

Provided herein are bioscaffolds and methods of making the bioscaffolds. The bioscaffolds are biocompatible, and include interconnected and discrete pores, such as macropores, nanopores, and combinations thereof. The methods provided herein utilize sponges or sponge-like apparatus as template for a glass and/or glass-ceramic precursor material in a desired shape prior to converting the precursor material to a glass or glass-ceramic article.

Formation of sufficiently large 3D nano-macroporosity in bone scaffolds remains a challenge in spite of several methods reported in literature. It is required for tissue ingrowth and for the concurrent degradation of implanted structure. Provided herein are new techniques and methods for fabricating bioscaffolds that include superior high surface area, nano-macroporous porosity. In some embodiments, the bioscaffolds are made by methods that include a sol-gel process combined with polymer sponge replication methods.

The formation of a desired 3D bioscaffold structure was demonstrated in 70 mol % $SiO_2$—30 mol % CaO glass composition as an example, in which porosity and other features were substantially uniform across the sample article. In such an example, the porosity and structure includes open, interconnected macropores with an average pore size of between from about 300 to about 600 μm. The interconnected macropores in such an exemplary bioscaffold are desirable for tissue ingrowth and vascularization when the bioscaffold is placed inside a living organism ("in vivo").

The exemplary bioscaffold made by methods herein preferably further includes nanopores. The nanopores co-exist with the macropores, but need not all be interconnected to one another. In the exemplary scaffold articles, the nanopores provide a high specific surface area (high being, for example, greater than or equal to about 150 $m^2/g$). Such high specific surface area is desirable for enhancing the bioscaffold's degradation rate, such as in vivo. These exemplary bioscaffolds, having interconnected macropores and coexisting interconnected and/or isolated nanopores hold promise for applications in hard tissue engineering. Optionally, isolated macropores can be present as well.

In one embodiment, new methods are provided for fabricating high surface area nano-macro porous glass scaffold with interconnected macropores. As used herein, "pore" includes any open channel, as well as any open holes in the scaffold material. As used herein, "macropore" or "macroporous" means that the pore has an average diameter of greater than about 10 µm. As used herein, "nanopore" or "nanoporous" means that the pore has an average diameter of smaller than about 100 nm. As used herein, "interconnected" means that there is a communicable connection between at least some of the pores. As used herein, "sponge" means any media made of porous material and having absorptive properties, such as absorption of liquid-based solutions and compositions. This includes, but is not limited to, foams, natural sponges, as well as man-made sponges made from natural or synthetic materials such as animal sponge (e.g. sea sponges), cellulose or other natural fibrous materials, as well as sponges made from polymers such as polyurethane, polyethers, polyester, among others.

The scaffolds provided herein can be used in hard tissue engineering, among other uses. In one exemplary method of using the bioscaffolds, progenitor cells harvested from a subject's body are seeded and grown on a scaffold to produce a "loaded scaffold." The loaded scaffold is then implanted into a subject animal or human to replace diseased tissue. In other embodiments, the scaffold is placed in a subject's body, where the scaffold becomes loaded as the subject's own tissues contact the scaffold and interact with it. In preferred embodiments, the bioscaffold provides a three dimensional (3D) structure for the regeneration of natural tissue either in vitro or in vivo. The scaffold preferably degrades gradually over time, and eventually is eliminated or replaced by natural tissue.

In some embodiments, the scaffolds include open, interconnected macropores. Preferably, the pores have an average diameter preferably larger than about 300 µm, with the interconnecting portions having an average diameter of at least about 100 µm. More preferably, the interconnecting portions have an average diameter of at least about 200 µm. Most preferably, the interconnecting portions have an average diameter of at least about 300 µm. Such interconnected macropores are desirable for tissue ingrowth and vascularization (blood vessel formation). In preferred embodiments, nanopores are also provided in the scaffold. Such nanopores enhance bioactivity and provide a desirably high specific surface area (e.g. ≥about 120-200 $m^2/g$). Such a high surface area is desirable for enhancing the degradation rate of the scaffold structures. The interconnected nanopores for high surface area also make the scaffolds provided herein useful for other purposes such as drug delivery, ambient or high temperature filtration, and catalyst support.

As previously described, in some embodiments, the bioscaffold not only provides a 3D structure for the regeneration of natural tissue, but also degrades gradually and, eventually be replaced by the natural tissue completely.

In one embodiment, the bioscaffold is useful for applications in hard tissue engineering. The scaffold includes a series of open, interconnected macropores having an average diameter size from about 300 µm to about 600 µm, which sizes are desirable and compatible for tissue ingrowth and vascularization. Preferably, the scaffold further includes nanopores that coexist with (but need not be interconnected with) the macropores. The nanopores enhance bioactivity and provide high specific surface area, such as about 120 to about 200 $m^2/g$, which is desirable for, among other things, enhancing the degradation rate of the scaffold when implanted inside the body.

In one embodiment, methods are provided for the formation of a bioscaffold having a desired 3D structure and interconnected macropores, as well as coexisting nanopores.

In contrast to any known prior bioscaffolds and methods by others, the exemplary methods herein produce exemplary bioscaffolds having a very high specific surface area to impart desirable properties such as biodegradability, as well as desirable interconnected macropores that are large enough and prevalent enough to allow vascularization when used in vivo, for example. Additionally, in examples where the macropores have sizes ranging from 300-600 µm and are highly interconnected, those features are desirable for tissue ingrowth and vascularization. Further, using our methods, scaffolds with complex shapes and different macropore patterns can be easily fabricated, since the macrostructure of the scaffold is the positive replication of the polymer sponge templates.

The use of sponge as a template to hold the precursor materials prior to heating, and during heating and glass formation, provides the advantage of 3D shape control. For example, scaffolds having complex shapes, as well as varying sizes and densities and patterns of macropores can be easily fabricated, since the macrostructure of the scaffold is the positive replication of the polymer sponge template.

EXAMPLES

In one embodiment, the method utilizes 70 mol % $SiO_2$ and 30 mol % CaO glass composition (also known as "70S30C") as a precursor material. However, bioscaffolds comprising other compositions can be easily fabricated by starting with a gel and/or powder of an appropriate precursor composition.

In this example, the 70S30C gel particles are fabricated by the sol-gel process. Briefly, calcium nitrate tetrahydrate ($Ca(NO_3)_2.4H_2O$) is dissolved in 0.05N acetic acid solution, to which tetramethylorthosilicate (TMOS) is added. In some sol gel process examples, 0.003N ammonia solution is used instead of acetic acid. However, the inventors have observed that bioscaffolds prepared with ammonia solution usually result in relatively lower surface area. In this example, the molar ratio of TMOS to $Ca(NO_3)_2.4H_2O$ is 7:3, although the ratio can be altered to accomplish a desired result in accordance with the inventions herein. After vigorous stirring, samples are aged at 40° C. to produce gelled samples.

The gelled samples were then dried, crushed and sieved through 225 size mesh to form a powder. The resulting powder is further ground for 3 hours in an attrition mill. After the milling step, the colloidal gel glass slurry was dried again to yield a fine dried xerogel powder. In this example, a new slurry was then prepared by adding 25 wt % of this dried xerogel powder to 75 wt % aqueous medium, containing 1 wt % binder and 0.5 wt % dispersant. The slurry was stirred vigorously to ensure substantial homogeneity before infiltrating with a polyurethane (PU) sponge that includes about 60 pores per inch. The excessive slurry was squeezed out. The as-coated slurry-infiltrated sponge was dried at 40 C in an oven. Then, the samples were heated at PC/min up to about 600° C. to decompose the PU of the sponge. Next, the resulting article was heated to 700° C. at a rate of 2° C./min and sintered for 2 hours, before cooling down to room temperature.

In this example, the sponge was a polyurethane foam sponge material available as a standard catalog item from The Filter Factory, Inc. of San Ynez, Calif., and identified as "Bulk reticulated polyurethane foam fan filter media" catalog number RF 0.5R-60. That commercially available foam sponge material was characterized as polyurethane having about 60 pores per inch. A small rectangular section of that sponge material was compressed by squeezing before placing it in the slurry composition in a container. Soaking was allowed for about 5 minutes. Excess slurry was removed by squeezing the soaked sponge. The sponge was then dried as described herein, before heating to a temperature and time sufficient to convert the slurry composition to a glass material in the form of a scaffold having dimensions of about 1 cm by 1 cm by 0.3 cm.

Figure 2:
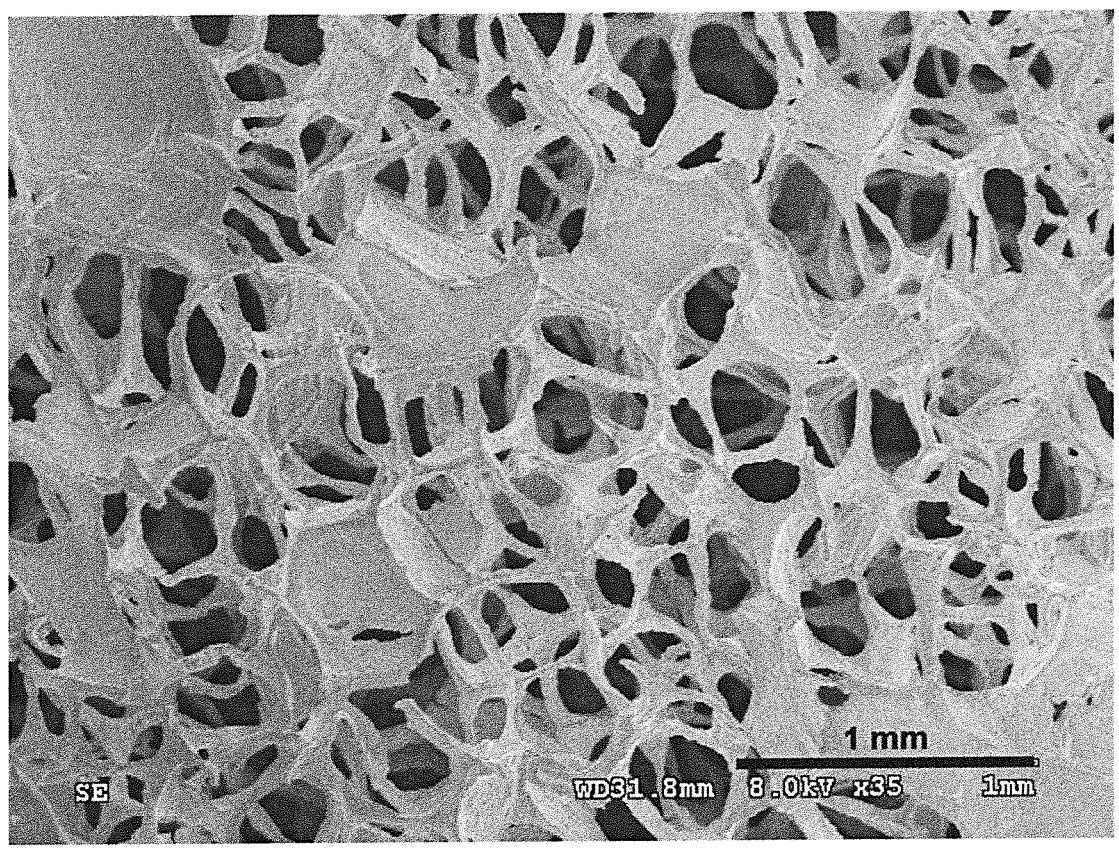
FIG. 2 is a scanning electron micrograph of an interconnected porous bioactive glass scaffold.
Figure 3:
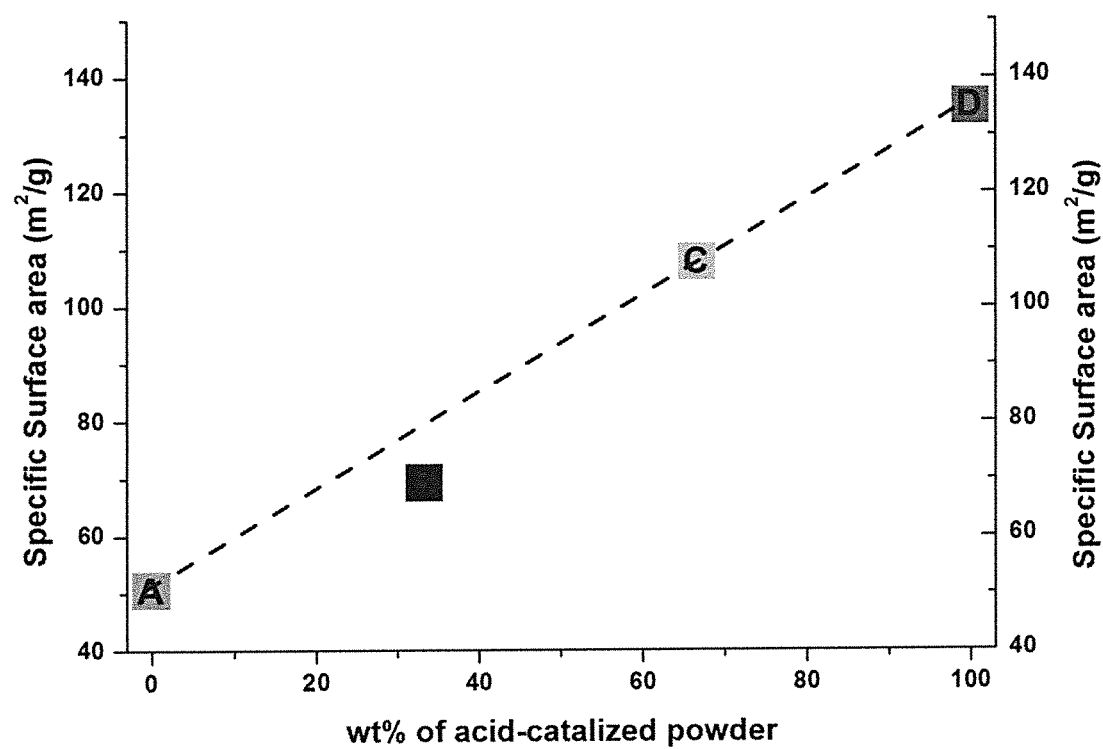
FIG. 3 illustrates nanopore size distribution in accordance with an exemplary bio scaffold herein.
Figure 4:
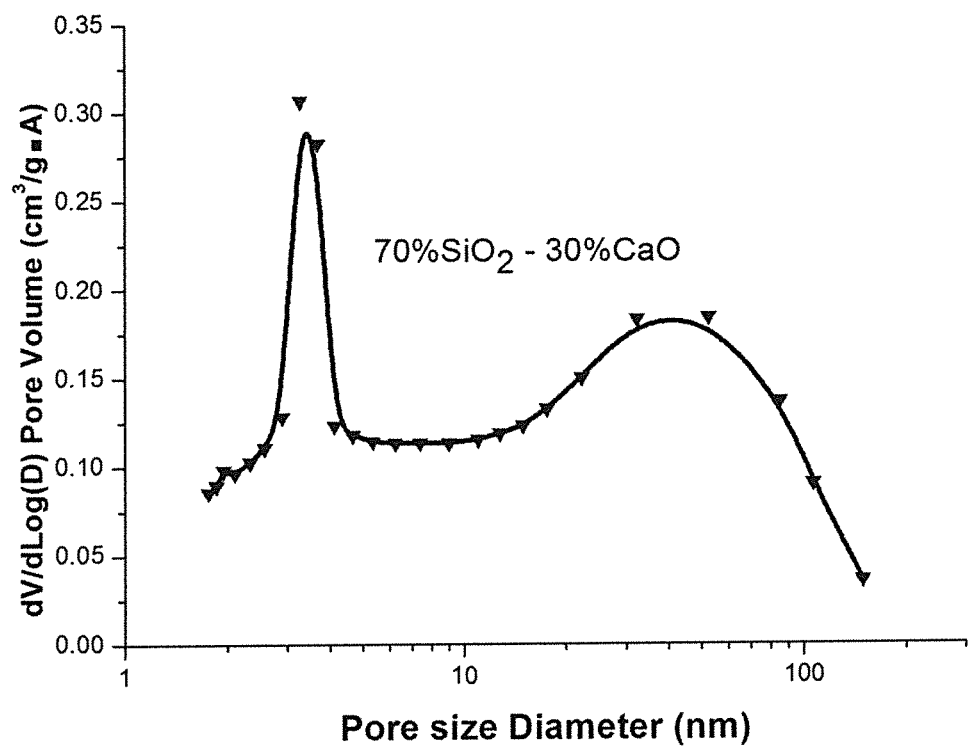
FIG. 4 illustrates various surface area of exemplary scaffolds prepared from the mixture of acid-catalyzed and basic-catalyzed sol-gel particles listed in Table 1.
Figure 5:
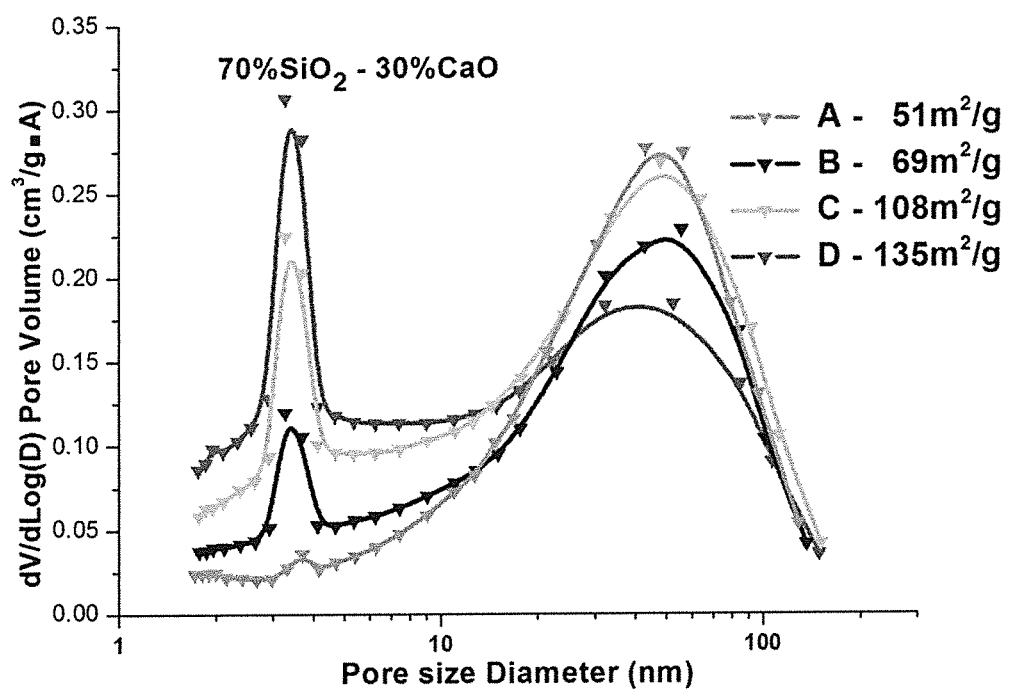
FIG. 5 illustrates pore size distribution of exemplary scaffolds prepared from the mixture of acid-catalyzed and basic-catalyzed sol-gel particles listed in Table 1.

The results of this example are shown in FIGS. 1-5. FIG. 1 illustrates a flow chart of the methods used. FIG. 2 shows a scanning electron micrograph of an interconnected porous bioactive glass scaffold. FIG. 3 illustrates nanopore size distribution in accordance with an exemplary bio scaffold herein. FIG. 4 illustrates various surface area of exemplary scaffolds prepared from the mixture of acid-catalyzed and basic-catalyzed sol-gel particles listed in Table 1. FIG. 5 illustrates additional pore size distributions of scaffolds prepared from the mixture of acid-catalyzed and basic-catalyzed sol-gel particles listed in Table 1.

The above example is non-limiting. Bioscaffolds having varying levels and patterns of porosity can be provided by starting with a precursor gel and/or powder of appropriate composition. Surface area of the resulting scaffolds can be selectively changed and controlled, such as by using a basic or acidic solution as catalyst. For example, in some embodiments, 0.003N ammonia solution (or some other basic solution like sodium hydroxide solution) or acidic solution like hydrochloric acid and nitric acid can be used instead of acetic acid as a catalyst for the gelation of solution. Generally, basic solutions make surface area of xerogel powders small, while acid solutions create xerogels with high specific surface area. Thus, for example, scaffolds prepared with ammonia solution resulted in relatively lower surface area than scaffolds prepared using acetic acid.

TABLE 1

Exemplary samples prepared by various mass ratios of acid-catalyzed and basic-catalyzed powders

| | Wt % of acid-catalyzed powder | Wt % of basic-catalyzed powder |
|---|---|---|
| Sample A | 0% | 100% |
| Sample B | 33.3% | 66.7% |
| Sample C | 66.7% | 33.3% |
| Sample D | 100% | 0% |

The resulting distribution of nanopores is selectively variable, as illustrated in FIG. 2, FIG. 4, and FIG. 5. Optimal nanopore distribution and optimal pore sizes will vary depending upon such factors as specific tissue (bones, teeth structures, and other structural members) to be repaired or replaced, its location in body, the age of the patient, the nature of the injury, and other factors.

Importantly, in previous studies by other scientists, scaffolds, fabricated by various techniques including 3D printing, freeze casting, polymer sponge replication method, using conventional ceramic and/or glassy materials were never sufficiently biodegradable. In other cases, scaffolds made from sol-gel materials were nanoporous, but in all such cases any macropores or interconnected macropores "throats" were too small, barely achieving 100 μm size. Furthermore, previous methods of fabricating sol-gel derived scaffolds by others have relied on the use of hydrofluoric acid to accelerate gelation in order to freeze the rapidly evolving macrostructure. Residual fluorine ions from such methods have shown to impart potentially cyto-toxic effects.

In the scaffold embodiments described herein, a high specific surface area has been achieved by the inclusion of nanopores. Nanopores are the result of the sol-gel process. For example, in the sol gel solution prepared by mixing the precursors in appropriate ratio, the alkoxide chemical such as TMOS hydrolyzes and poly-condensates into nano-particles. Addition of catalyst controls the transition of the sol into a gel. After sol-gel transition, the dry gel includes these weakly connected nano-particles. The nanopores are the interstitial space between these nano-particles. Depending on the acid or basic catalysis condition, the hydrolysis and poly-condensation process can be varied resulting in different size and texture of the nano-particles. Then the scaffold made of these particles yield various surface area and nanopore size. Simply put, the size of the nanopores can be controlled by choosing appropriate acid or basic catalysis condition.

The above example is non-limiting. Although the chemical used as a precursor was TMOS, alternatively TEOS, calcium nitrate, and other chemical equivalents compatible with the sol-gel process can be used. The use of such chemicals to synthesize nanoporous materials was exclusively through sol-gel process. However, various other chemical compositions can be easily synthesized by mixing these or similar precursors in different molar ratio. The exemplary proof-of-concept utilized a 70S30C composition because that composition has been shown to be bioactive. Nonetheless, the methods herein can be easily applied to other compositions in a sol-gel process, followed by sponge replication methods herein to yield scaffolds for use in other material science applications.

In bioscaffold uses, it is believed that the inclusion of nanopores makes the scaffold significantly more biodegradable, as well as more bioactive. Preferably, the scaffolds further include macropores with size ranging from about 300 to about 600 μm, the macropores being highly interconnected, which is desirable and beneficial for tissue ingrowth and vascularization. Further, the scaffolds with complex shape and different macropores can be easily fabricated, since the macrostructure of the scaffold is the positive replication of the polymer sponge templates.

The scaffold can be used in hard tissue engineering. However, due to possible insufficient mechanical strength, the exemplary scaffolds described herein made from 70S30C alone may not be suitable for use in in-vivo, load-bearing applications. However, embodiments that are suitable for load bearing applications are contemplated through selection and control of precursors of glassy and/or ceramic materials and the levels and types of porosity, as well as control and design of shapes and dimensions of scaffolds. By way of further example, the selection of the sponge template for such features as pore size, pore interconnections, sponge material type, and shapes will determine many features of the positive replication that becomes the scaffold upon heating and conversion of a composition absorbed into and onto the sponge, followed by thermal degradation of the sponge template.

By way of further explanation, after soaking, spraying, injecting, or otherwise infiltrating the sponge with slurry, the infiltrated sponge can be evaluated for slurry content, and slurry content amounts adjusted by the user. Evaluating can be by weighing, for example, and comparing sponge weight before infiltration to post-infiltration weight. To accomplish a desired slurry composition that will yield the desired scaffold having a desired density, any excess slurry can optionally be removed by wringing, squeezing, compressing, using centrifugal or centripetal forces, drying the sponge, and combinations thereof.

Further, the inventors have conceived of development of various other features of bioscaffolds prepared by the present methods, such as 1) improving the mechanical properties of the bioscaffold through selection of materials and the method steps, as well as the template; 2) tailoring the surface areas to meet various requirements on degradation rate of the scaffold, such as by increasing or decreasing the nanoporosity through selection of acids, bases, and catalysts as described herein, and 3) further control of macroporosity and nanoporosity through variation of materials and methods herein.

For example, an advantage of the methods herein is that bioscaffolds can be produced having various sizes of nanopores and with selectively variable surface areas. Those features can be provided and controlled easily by mixing the acid-catalyzed high-surface area powder(s) with the basic-catalyzed low-surface area powder in appropriate preselected ratio(s). As a demonstration of this concept, scaffolds prepared by various mass ratio of acid-catalyzed and basic-catalyzed powder are listed in Table 1. FIG. 3 shows the overall surface area of these bioscaffolds, which is linearly proportional to the ratio of acid-catalyzed and basic-catalyzed powders. Furthermore, the average nanopore size can be controlled in this way too (as shown in FIG. 4). Therefore, surface area and nanopore size of bioscaffold can be easily tailored continuously. Such control allows for tailoring of the degradation rate of resulting scaffolds for various applications.

While this description is made with reference to exemplary embodiments, it will be understood by those skilled in the art that various changes may be made and equivalents may be substituted for elements thereof without departing from the scope. In addition, many modifications may be made to adapt a particular situation or material to the teachings hereof without departing from the essential scope. Also, in the description there have been disclosed exemplary embodiments and, although specific terms may have been employed, they are unless otherwise stated used in a generic and descriptive sense only and not for purposes of limitation, the scope of the claims therefore not being so limited. Moreover, one skilled in the art will appreciate that certain steps of the methods discussed herein may be sequenced in alternative order or steps may be combined. Therefore, it is intended that the appended claims not be limited to the particular embodiment disclosed herein.

The invention claimed is:

1. A method of producing a biocompatible scaffold, the method comprising the steps of:
   a) infiltrating a sponge template with a slurry composition, the slurry composition comprising at least one glass precursor material, wherein the glass precursor material comprises at least one nanoporous xerogel glass powder;
   b) optionally removing excess slurry from the sponge template; and
   c) heating the sponge template to a temperature and for a time sufficient to convert the slurry composition into the biocompatible scaffold comprising at least a glass, the scaffold comprises interconnected macropores, and interconnected nanopores, wherein the nanopores have an average diameter less than about 100 nm.

2. The method of claim 1, wherein the nanoporous xerogel glass powder is made by a sol-gel process.

3. The method of claim 2, wherein the xerogel glass powder comprises particles comprising about 70 mol % $SiO_2$ and about 30 mol % CaO.

4. The method of claim 1, wherein the slurry composition further comprises an aqueous medium, containing about 1 wt % of a binder and about 0.5 wt % of a dispersant.

5. The method of claim 1, wherein the series of interconnected macropores comprise macropores and interconnections each having an average diameter of between about 300 to about 600 μm.

6. The method of claim 1, wherein the scaffold has a specific surface area that is between about 50 to about 160 $m^2/g$.

7. The method of claim 1, wherein the step of providing a slurry composition comprising at least one glass precursor material further comprises preparing the slurry composition by adding about 25 wt % of dried xerogel powder to about 75 wt % aqueous medium, the medium optionally further comprising about 1 wt % binder and about 0.5 wt % dispersant.

8. The method of claim 1, wherein the optional step of adjusting the amount of the slurry composition in the sponge to a desired amount comprises at least one of wringing, squeezing, compressing, or drying the sponge.

9. The method of claim 8, wherein step of adjusting the amount of the slurry composition in the sponge comprises drying the sponge by a temperature at least about 200 degrees below the glass transition temperature of the glass precursor material.

10. The method of claim 1, wherein the step of heating the soaked sponge for a time sufficient at a temperature comprises gradually heating by increasing the temperature by less than about 5° C. per minute up to a desired temperature sufficient to convert the composition to yield a scaffold, wherein said heating thermally degrades the sponge.

11. The method of claim 10, further comprising the step of sintering the scaffold at a time and temperature sufficient to produce a hardened, stabilized scaffold.

12. The method of claim 11, wherein the step of sintering is performed at a temperature of at least about 700° C.

13. The method of claim 12, wherein the step of sintering is performed by increasing the temperature from the desired temperature of claim 12 up to the sintering temperature at a rate of about rate 2° C. per minute.

14. The method of claim 13, wherein the step of sintering comprises holding the sintering temperature for at least about 2 hours, before cooling down to room temperature.

15. The method of claim 1, wherein the step of providing a slurry composition comprising at least one glass precursor material further comprises the steps of:
   a) dissolving calcium nitrate tetrahydrate ($Ca(NC_3)_2.4H_2O$) in a catalyst solution;
   b) adding tetramethylorthosilicate (TMOS) to the acetic acid solution;
   c) stirring, followed by aging at 40° C. to yield a gelled sample;
   d) crushing and drying the gelled samples to yield xerogel particles;
   e) grinding the xerogel particles in an attrition mill with a solvent to form a fine xerogel powder; and
   f) optionally, drying the fine xerogel powder for use in preparing the slurry composition.

16. The method of claim 15, wherein the catalyst solution comprises at least one of an acid or a base.

17. The method of claim 15, wherein the step of attrition milling comprises using $Y_2O_3$-stabilized $ZrO_2$ milling media and a solvent.

18. The method of claim 15, wherein the step of adding TMOS comprises accomplishing a molar ratio of TMOS to $Ca(NO_3)_2 4H_2O$ of about 7:3.

* * * * *